US012212076B2

(12) United States Patent
Lenive et al.

(10) Patent No.: US 12,212,076 B2
(45) Date of Patent: Jan. 28, 2025

(54) PHASED ARRAY ANTENNA

(71) Applicant: TTP PLC, Royston (GB)

(72) Inventors: Vlad Lenive, Royston (GB); Michael Lukin, Royston (GB); Adrian Hillier, Royston (GB)

(73) Assignee: TTP PLC, Royston (GB)

(*) Notice: Subject to any disclaimer, the term of this patent is extended or adjusted under 35 U.S.C. 154(b) by 159 days.

(21) Appl. No.: 17/438,140

(22) PCT Filed: Mar. 12, 2020

(86) PCT No.: PCT/GB2020/050616
§ 371 (c)(1),
(2) Date: Sep. 10, 2021

(87) PCT Pub. No.: WO2020/183181
PCT Pub. Date: Sep. 17, 2020

(65) Prior Publication Data

US 2022/0190476 A1 Jun. 16, 2022

(30) Foreign Application Priority Data

Mar. 12, 2019 (GB) ..................................... 1903351

(51) Int. Cl.
*H01Q 3/46* (2006.01)
*H01Q 3/20* (2006.01)
(Continued)

(52) U.S. Cl.
CPC ................ *H01Q 3/46* (2013.01); *H01Q 3/20* (2013.01); *H01Q 15/147* (2013.01); *H01Q 19/193* (2013.01)

(58) Field of Classification Search
CPC ...... H01Q 3/46; H01Q 15/147; H01Q 19/193; H01Q 3/20
See application file for complete search history.

(56) References Cited

U.S. PATENT DOCUMENTS 5,063,389 A * 11/1991 Reits ........................ H01Q 3/01 343/915
6,081,234 A 6/2000 Huang
(Continued)

FOREIGN PATENT DOCUMENTS

EP 3021419 A1 * 5/2016 ........... H01Q 15/147
JP H01255301 A * 10/1989
JP H01255301 A1 * 10/1989

OTHER PUBLICATIONS

"Flush", 2018, Encyclopedia.com (Year: 2018).*
(Continued)

*Primary Examiner* — Dameon E Levi
*Assistant Examiner* — Anh N Ho

(57) ABSTRACT

A phased array antenna comprises an array of reflective cells, each cell being defined by a wall positioned within the array the wall arranged to define a waveguide, and having a moveable reflector positioned within the wall. Each reflector is arranged such that it is not in electrical contact with its respective wall and such that, in use it can be moved to tune the antenna. A feed and subreflector are positioned within the array and arranged to transmit and/or receive electro-magnetic signals to and/or from the array.

8 Claims, 3 Drawing Sheets

(51) Int. Cl.
*H01Q 15/14* (2006.01)
*H01Q 19/19* (2006.01)

(56) References Cited

U.S. PATENT DOCUMENTS

| | | | | |
|---|---|---|---|---|
| 6,441,794 | B1 * | 8/2002 | Tang | H01Q 19/192<br>343/781 CA |
| 2005/0017913 | A1 * | 1/2005 | Orfei | H01Q 15/147<br>343/912 |
| 2012/0229355 | A1 * | 9/2012 | Scolamiero | H01Q 1/08<br>343/915 |
| 2014/0266955 | A1 * | 9/2014 | Yi | H01Q 15/147<br>343/837 |
| 2015/0145726 | A1 * | 5/2015 | Stambovsky | H01Q 3/01<br>343/915 |
| 2017/0365932 | A1 * | 12/2017 | Spirtus | H01Q 19/192 |
| 2018/0166781 | A1 * | 6/2018 | Snyder | H01Q 21/08 |

OTHER PUBLICATIONS

"flush meaning", 2023, Definitions from Oxford Languages on Google.com (Year: 2023).*

International Search Report and Written Opinion for PCT/GB2020/050616, mailed May 19, 2020.

Philippe Ratajczak et al., "Active reflectarray based on high impedance surface," Antennas and Propagation International Symposium, 2007 IEEE, IEEE, Piscataway, NJ, USA, Jun. 9, 2007, pp. 5327-5330.

* cited by examiner

PHASED ARRAY ANTENNA

CROSS-REFERENCE TO RELATED APPLICATIONS

This application is a U.S. national stage filing under 35 U.S.C. § 371 of International Application No. PCT/GB2020/050616, entitled "PHASED ARRAY ANTENNA," filed Mar. 12, 2020, which claims priority to GB Application No. 1903351.3, entitled "PHASED ARRAY ANTENNA," filed Mar. 12, 2019, both of which are incorporated herein by reference in their entirety for all purposes.

BACKGROUND

The present invention relates to a phased array antenna. Phased array antennas are used in many communications applications, most notably in the field of aerospace and satellite communications. In such applications there is a need to tune the antenna array phase pattern to provide beamforming for transmission and reception signals. Such tuning can take the form of electronic tuning, or mechanical tuning, or a combination of both. However, in either case, there is often a significant constraint on the ability to tune phased array antennas simply and effectively, given that the applications in which they are often used have significant constraints in terms of weight and space and power available for employment of the antenna. Furthermore there is a requirement for the tuning mechanism to be robust and reliable given that the antennas involved are often employed in harsh environments.

SUMMARY

The present invention seeks to provide a tuneable phased array antenna which is simple to implement, robust and reliable, and which is compact when compared to many prior art antenna systems.

According to the present invention there is provided a phased array antenna comprising an array of reflective cells, each cell being defined by a wall positioned within the array the wall arranged to define a waveguide, and having a moveable reflector positioned within the wall, each reflector arranged such that it is not in electrical contact with its respective wall; and a feed and subreflector positioned within the array and arranged to transmit and/or receive electromagnetic signals to and/or from the array.

The antenna of the present invention provides a tuneable phased array antenna which has a simple and robust tuning mechanism and which has a low-loss compact structure which is capable of operating both receive and transmission modes in a full duplex mode of operation using dual polarised signals. The provision of adjustable components in each cell of the array which do not contact with interior walls of their respective cells means that improved antenna performance can be provided and that there is a flexibility in choice of dielectric material for use in the tuning component, as well as the material used to construct the waveguides. Furthermore, it enables a reduced friction, or even frictionless, movement which reduces the power and operating requirements on the individual actuators associated with the adjustment components, resulting in the potential to reduce the overall weight and size of the antenna array whilst improving reliability of adjustment.

The feed pipe and subreflector arrangement may be arranged to operate at both a transmit and a receive frequency or may be arranged to operate with transmit and receive signals of differing polarisations.

The antenna may further comprise an actuator associated with each cell and arranged to move the position of the reflector element within the cell to tune the antenna by independent movement of each reflector. Plural actuators may be provided for each cell. In an alternative arrangement actuators may be provided which drive reflectors in more than one cell.

BRIEF DESCRIPTION OF THE DRAWINGS

Examples of the present invention will now be described with reference to the accompanying drawings, in which.

DETAILED DESCRIPTION

Figure 1:
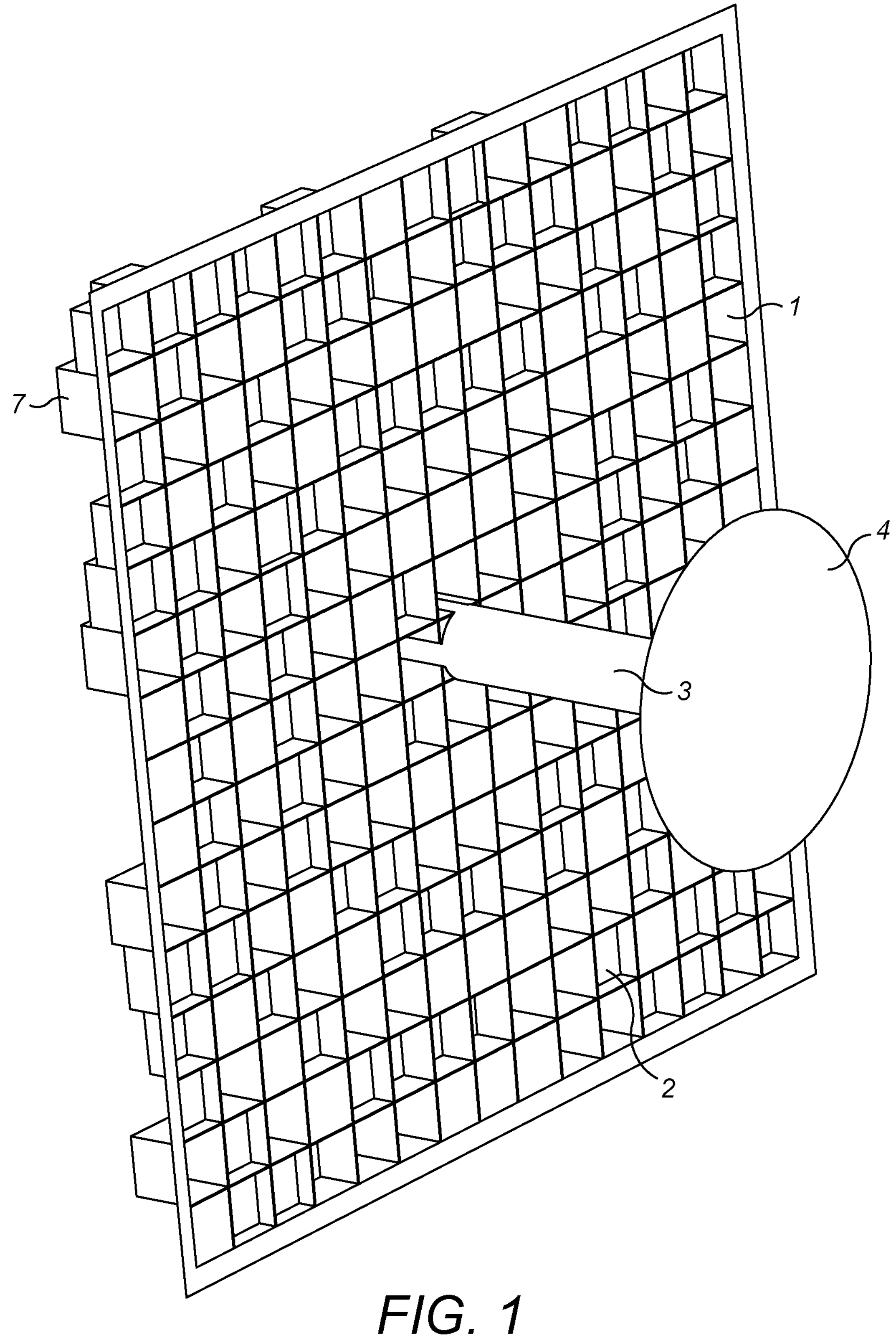
FIG. 1 is a front view of a phased antenna array according to the present invention.

Referring to FIG. 1, a phased array antenna 1 according to the present invention comprises, in this example, plural individual tuneable cells 2 formed in a square array and has a feed pipe 3 and subreflection component 4 positioned in the centre thereof.

The construction of each tuneable cell 2 will be described in more detail below with respect to FIG. 3, but the general principle applied in the present invention is to structure each cell such that it has a moveable reflective element within it which is designed to have parallel resonance at the frequency band of the transmission and reception frequencies of the phased array antenna 1 such that it provides full reflection of the signal and does not require galvanic contact with walls 7 of the cell 2. The walls 7 are structured to define a waveguide. The phased array antenna 1 can be tuned by moving the individual reflective elements 6 within each cell 2 independently to tune the antenna 1 and direct its beam as appropriate, as will be discussed in more detail below.

Figure 2:
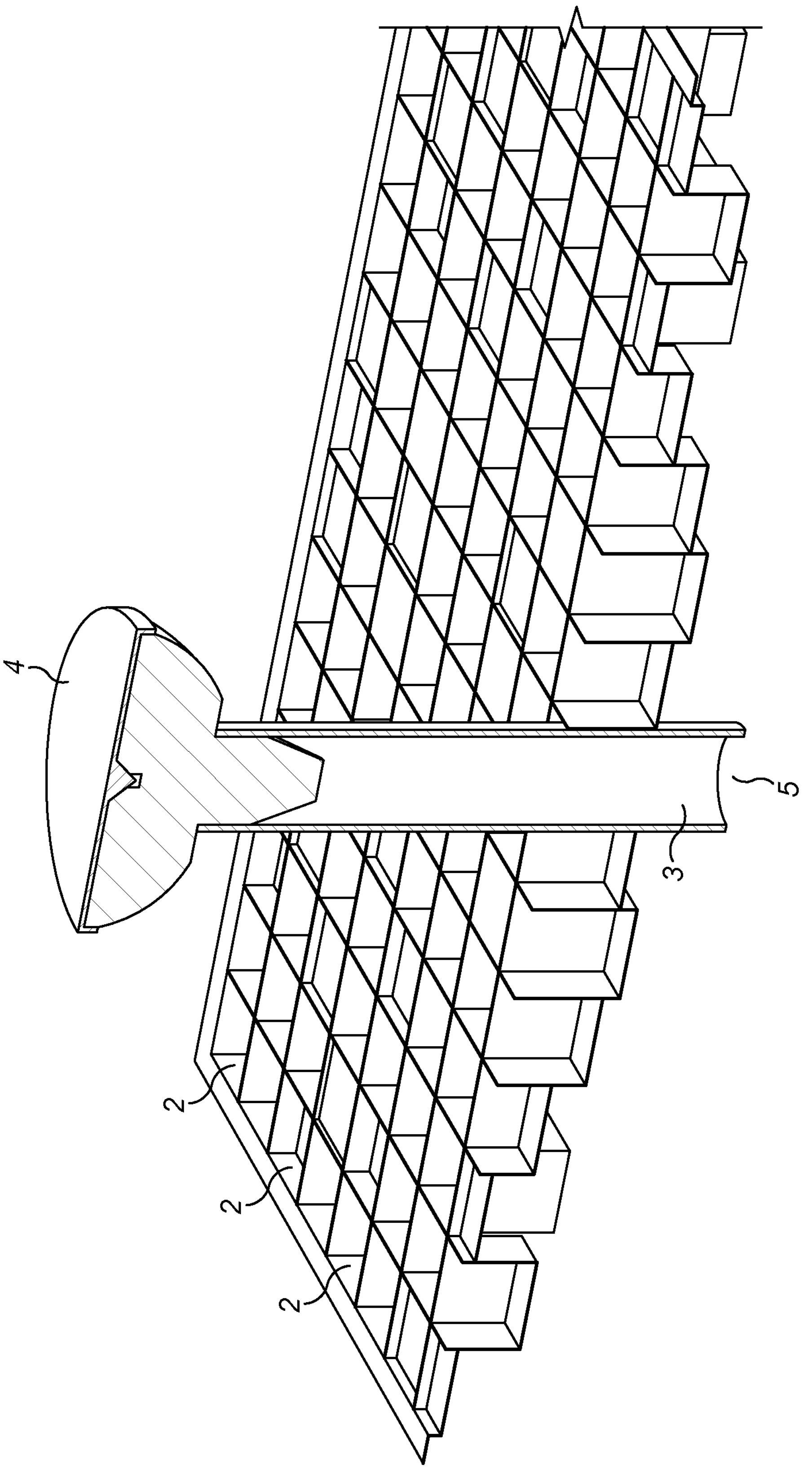
FIG. 2 is a side cross-sectional view of the feed in an antenna according to the present invention.

As can be seen from FIG. 2, the feed pipe 3 is constructed to operate both in reception and transmission modes and has a structure which includes a subreflector component 4 which either reflects signals from the cells 2 into a central feed 5, or reflects a transmitting signal from the central feed 5 to the cells 2. This simple feed pipe structure 3 reduces the overall size of the array in the direction of feed by employing the subreflector component 4 and also enables the employment of dual polarised signals to be transmitted and received, which enables the device to be used where such dual polarisation of signals is required, for example in satellite communication.

The structure of the feed pipe 3 and subreflector components is such that it is possible to use it in both transmit and receive bands as long as they both fit within the pass band of the subreflector component 4 and feed pipe 3. Using this structure in combination with the array of tuneable cells 2 ensures that both transmission and reception frequencies can be handled by the phased array antenna 1 through appropriate adjustment of the position of reflection elements 6 within individual cells 2, as long as each cell 2 is structured to have the appropriate size, and the reflection element 6 is formed from the appropriate material. Indeed, as will be described in more detail below, with the present invention it is possible to select the physical structure of the reflection elements 6 such that they can operate at separate transmission and reception frequencies by the use of dielectric filling inside each element or by provision of more than one reflective component within each reflective element 6, for example through employment of rings of different diameters. These reflective components 6 should be isolated from each other electromagnetically. There are two ways to achieve this: isolate using two orthogonal polarizations or isolate them by introducing frequency separation.

By dual tuning of each cell 2 through appropriate selection and construction of the reflective elements 6 such that they can operate at both transmission and reception frequencies it is possible to control the phase independently for transmission and reception in each tuneable cell 2. Alternatively, the antenna 1 can operate to exploit polarisation separation by structuring the reflective elements 6 to be tuned to two orthogonal polarisations, for example by use of dipoles located in orthogonal planes. This structure gives the possibility of obtaining independent phase shift for transmission and reception with close frequencies between the two by employment of polarisation isolation. In either case the structure of the feed pipe 3 and subreflector component 4 allows for the appropriate handling of both reception and transmission.

In the example shown, the array of cells 2 is formed in a single plane and defines a square. However, it will be appreciated that the array may be formed into a non-planar structure, and could be hexagonal, rectangular or circular. Furthermore, the cells 2 may, dependent upon the application, have a square cross section, as shown, or may have alternative cross sectional shapes, such as circles, octagons or circles. Generally a C4 symmetry is desired.

Figure 3:
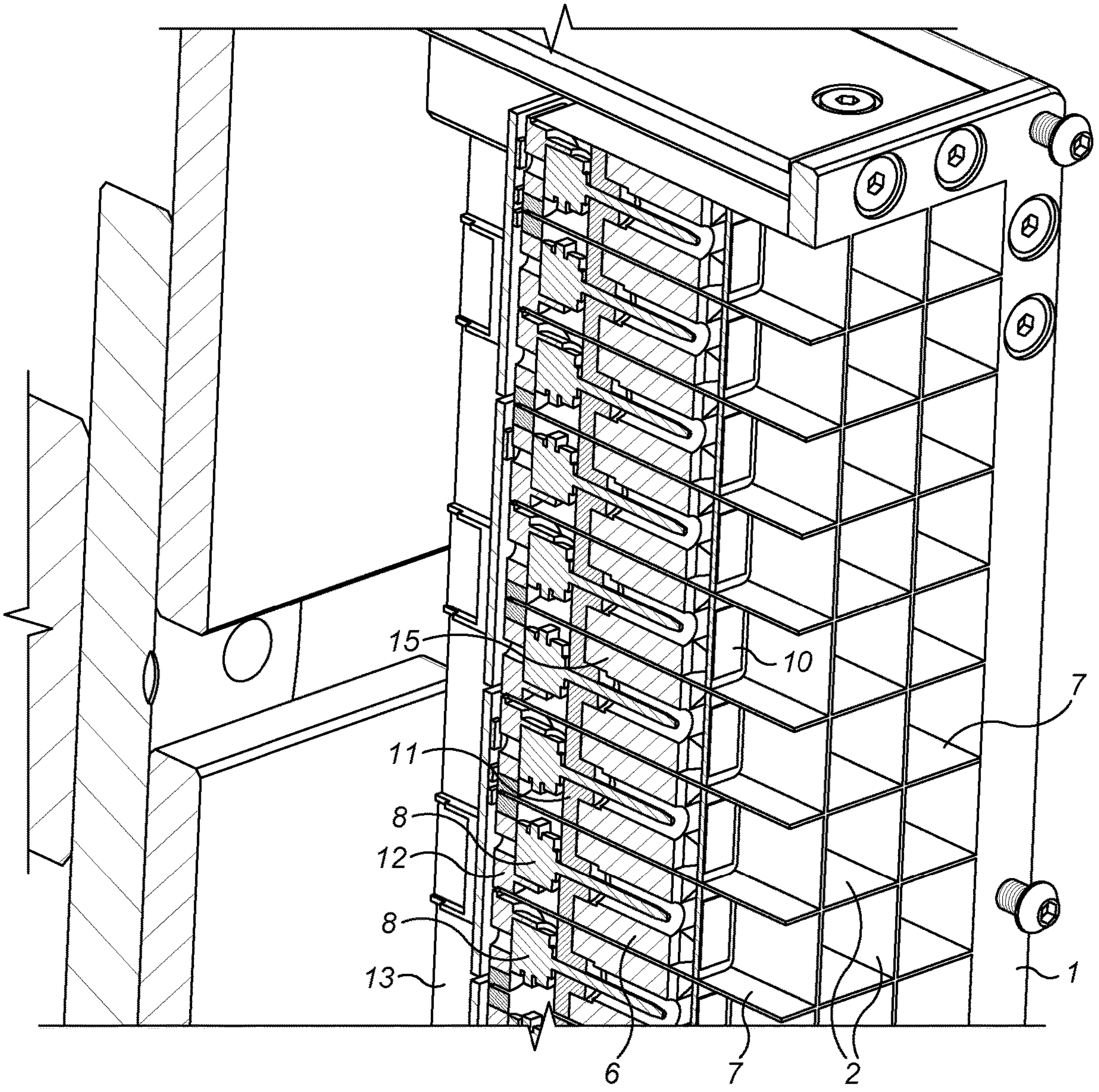
FIG. 3 is a side cross-sectional view of adjustable cells employed in the antenna of the present invention.

Referring to FIG. 3, a cross-sectional view of a cell structure 2 is provided, in which, in this example, a reflective element 6 is provided within walls 7 and attached to a drive actuator 8. The actuator 8 in this example is a stepper motor, but other motors such as piezoelectric, shape memory alloy and shape memory polymer, pneumatic or hydraulic actuators, are possible, and can be selected dependent upon weight and size requirements, as well as the degree of accuracy of adjustment that is required. The reflective element 6 can be moved within the walls 7 as required to control the overall operation of the phased array antenna 1 for tuning. It will be noted that the reflective element 6 does not contact the walls 7 electrically. The walls 7 can be formed individually or, as shown in the figures as a grid defining the overall array. It will be appreciated that orthogonal walls can be electrically connected between each other at their intersections along the intersecting lines to define an array of waveguides. They are generally formed from a light weight conductive material such as aluminium. This is because no galvanic connection is required between the reflective element 6 and the walls 7 for the cell to operate. This is achieved because the reflective element 6 is employed to provide full reflection of a signal on its upper surface 10. The advantage of this structure is that it reduces friction within the device, improves manufacturing tolerances, and also means that the material of the reflective element can be varied in accordance with particular operating requirements. In examples where there is physical contact between the reflective element 6 and the walls 7, because it is not galvanic in nature the material which is in contact can be formed from low friction material, can be non-conductive, and may be material which is flexible and requires little manufacturing tolerance. By avoiding the need for galvanic contact it is also possible to select structures for the reflection element 6 which allows reflection at two or more frequencies to deal with different frequencies for reception and transmission.

The invention also can be arranged to handle signals of different polarisations to deal with transmission and reflection signals at different polarisations but similar frequencies. The cell structure of the invention allows the employment of generalized classes of reflective shapes exploiting properties of electromagnetic fields having specified dependence on the azimuth angle which makes the field to adhere to symmetry conditions applied by rotational symmetry of the order N. This is done by exploiting the structures that are also supporting rotational symmetry of the order N. This achieves maximum possible polarization isolation between modes of two orthogonal polarizations.

With the structure of the invention, as no galvanic connection is required, it is also possible to provide, through the use of multiple drive actuators 8 and multiple reflective elements 6 within an individual cell 2, providing reflective components 6 which move by different amounts to provide different reflection at different frequencies or phases, again, to optimise performance for reception and transmission within a single device.

Referring to FIG. 3, it can be seen that the reflective element 6 can be formed from a small reflector component, formed from a printed circuit board, metal strip or foil, for example, attached to a support component which can be formed of a low friction material, such as Rexolite, ABS or polyurethane which simplifies the manufacture of the element it provides an effective adjustable reflector for each cell 2.

As can also be seen from FIG. 3, the reflective element 6 may be supported by a support member 11 attached to the actuator 8, with the actuator 8 being supported by an actuator support member 12 which connects to a central control board 13. Each cell 2 can have its individual reflective element 6 driven independently by its respective actuator 8 through control from the central control circuit board 13 to provide appropriate tuning of the overall array. Individual screws 15 can be provided for each support member to retain it on its respective reflective element 6.

Another part of the structure of the present invention which has benefit is that the associated control and processing analytics can be provided as part of the array on a single board 14 which acts as a control board and includes all the complex components for calibration and setting of the array. The walls 7 of the individual cells, and the reflective elements 6 of the respective cells with their respective actuators 8 then being mounted on the board 13. This improves maintenance and simplifies manufacture. It also provides an option with the present invention for the array antenna 1 of the invention to be set up by attachment of the walls 7 and reflection elements 6 and array of actuators 8 to the control board 13. Appropriate adjustment and tuning of the phase antenna array 1 can then be performed and the higher cost control electronics, and optionally also the actuators 8, then being removed so that the array can be then installed in its end application without the need for the high cost motor and control components to be in place, but still providing an appropriately tuned phased array antenna 1 that is suitable for a particular application. This aspect of the present invention allows a phased array antenna to be quickly and accurately pointed for a fixed geostationary satellite or point-to-point application, with the beam pattern optimised to reject any local interferers. The high cost actuator and control components can be removed and re-used to point other fixed antenna terminal installations.

As will be appreciated from the above, the present invention has the ability to provide a compact yet effective phased array antenna 1 which has reduced cost, yet which is robust and reliable, and which has multiple applications, for example fixed LEO tracking, satellite on the move, or satellite on the pause applications.

The invention claimed is:

1. A phased array antenna comprising:

an array of reflective cells, each of the reflective cells of the array of reflective cells being defined by a wall positioned within the array, the wall arranged to define a waveguide, and having a moveable reflector positioned within the wall, each of the movable reflectors arranged such that it is not in electrical contact with its respective wall and such that, in use it can be moved to tune the phased array antenna, each of the moveable reflectors are formed from a reflective component connected to a non-conductive component that is slidable within each respective wall, each of the non-conductive components is formed of a low friction material; and a feed and a subreflector positioned within the array and arranged to transmit and/or receive electromagnetic signals to and/or from the array.

2. The antenna according to claim 1, wherein the feed and the subreflector are arranged to operate at both a transmit and a receive frequency.

3. The antenna according to claim 1, wherein the feed and the subreflector are arranged to operate with transmit and receive signals of differing polarisations.

4. The antenna according to claim 1, wherein each of the moveable reflectors has a reflecting surface having C4 symmetry.

5. The antenna according to claim 1, wherein each of the reflective cells has more than one moveable reflector positioned therein, each of the more than one moveable reflectors within the reflective cell is independently moveable.

6. The antenna according to claim 1, further comprising:

an actuator associated with each of the reflective cells and arranged to move the position of the moveable reflector within the reflective cell to tune the phased array antenna by independent movement of each of the moveable reflectors.

7. The antenna according to claim 6, further comprising:

a control board in electrical contact with each of the actuators and arranged to control each of the actuators to adjust each of the moveable reflectors to tune the phased array antenna.

8. The antenna according to claim 7, wherein the control board and the actuators are arranged to be removable from the array of reflective cells after the antenna has been tuned.

* * * * *